Aug. 28, 1962

R. J. KUTZLER 3,051,137

CONTROL APPARATUS

Filed Sept. 30, 1959

INVENTOR
ROBERT J. KUTZLER

BY *Vernon A. Johnson*

ATTORNEY

United States Patent Office 3,051,137
Patented Aug. 28, 1962

3,051,137
CONTROL APPARATUS
Robert J. Kutzler, Minneapolis, Minn., assignor to Minneapolis-Honeywell Regulator Company, Minneapolis, Minn., a corporation of Delaware
Filed Sept. 30, 1959, Ser. No. 843,506
14 Claims. (Cl. 121—38)

This invention relates to combined automatic and manual control systems, and more particularly, to such systems wherein the actuators of the automatic portion of the system utilize a compressible fluid such as air to achieve an output force. Combined automatic and manual control systems, particularly of the type used in military aircraft, customarily provided both series and parallel servomotors connected in the overall control linkage. When the automatic portion of the system is not engaged, the manual control stick moves the series servomotors and the output ram of the parallel servomotors, in addition to moving the craft control surface. However, it has become a safety requirement for the light-weight commercial aircraft utilizing such a combined system, to provide a linkage that will permit manual control of the craft totally independent of the automatic portion of the control system. This makes it necessary to adopt new techniques for combining the systems, and more particularly, new control linkages permitting independent manual operation.

It is additionally important in the lighter aircraft to provide a simple and inexpensive automatic control craft to provide a simple and inexpensive automatic control system that is relatively light in weight. Thus, it is preferable to use the source of pneumatic energy that normally exists on a lightweight aircraft, such as the conventional pressure or vacuum pump used to control flight instruments, rather than using a hydraulic system and thereby necessitate the installation of a relatively heavy hydraulic pump. The use of air-operated actuators introduces various problems related to the compressibility of the fluid, and the relatively large quantity thereof that is required to achieve sufficient power, adequate frequency response, and movement of the aircraft control surface that is proportional to the magnitude of the error signal in the automatic-pilot bridge circuit.

Thus, it is a primary object of my invention to provide a combined automatic and manual control system for a steerable craft wherein the control linkage permits manual control of the craft independently of the automatic portion of the system.

A further object is to provide such a system wherein pneumatically controlled actuating means are used in the automatic portion of the system to achieve steering of the craft that is proportional to the magnitude of the control signal developed in said automatic portion.

A further object is to provide a combined automatic and manual control system of the type described, that is simple and dependable, and relatively low in cost and weight.

These and other objects of my invention will become apparent from the following description of a preferred form thereof, and the following single sheet of drawings illustrating that form, in which.

*General Operation*

Figure 1:
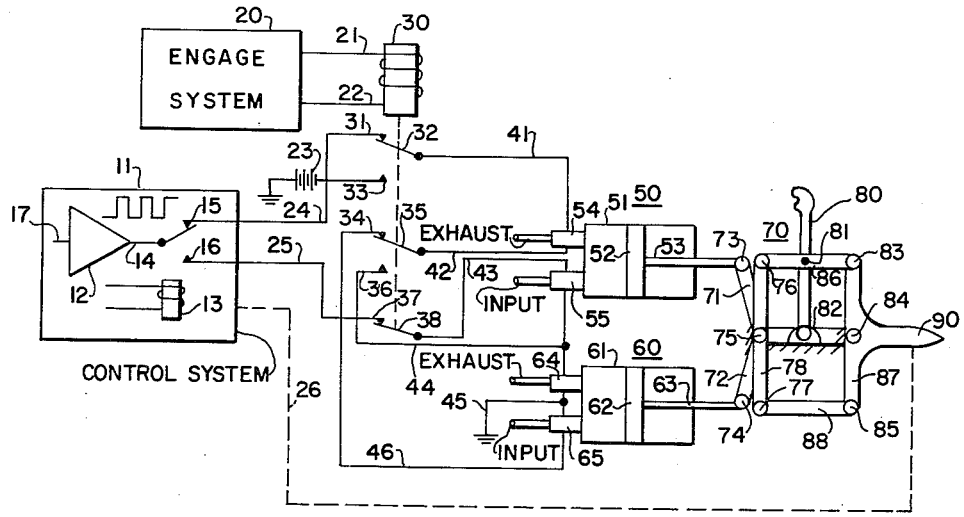
FIGURE 1 is a schematic diagram of my complete control system.

During normal operation of my system, and with the autopilot engaged (relay 30 energized), a control signal on lead 14 in the form of a series of square wave pulses is effective to pulse normally-closed valves 54 and 65 to thereby permit air pressure to enter through valve 65 into cylinder 61 of actuator 60. This causes piston 62 and output ram 63 of actuator 60 to move to the right. Crank arm 72 then forces parallelogram linkage 78, 88, 87, 86 to the right along leg 88 and to the left along leg 86, thereby rotating control surface 90 in a counterclockwise direction. Crank arm 71 is thereby also forced to rotate in a counterclockwise direction, which in turn carries output ram 53 and piston 52 of actuator 50 to the left. When the control surface 90 reaches the desired position, a feedback signal on linkage 26 is effective to null out the control signal on lead 14, thereby preventing further rotation of surface 90. Clockwise rotation of surface 90 may be achieved by operation of reversing relay 13 in control system 11, which causes the control signal on lead 14 to pulse normally closed valves 55 and 64.

During manual control, and with the autopilot disengaged, valves 55 and 65 remain closed and exhaust valves 54 and 64 are opened by a circuit including battery 23. Control stick 80 is then directly effective, through the parallelogram linkage, to operate control surface 90, and is also effective to force the pistons 52 and 62 to the left end of their respective actuators as the control stick 80 is moved back and forth through its maximum travel. Thereafter, the parallelogram linkage and control stick, together with the control surface, can be moved freely and totally independent of the automatic control system and actuators.

*Detailed Operation*

Control system 11 in FIGURE 1 is very broadly shown to include a control signal input lead 17, an amplifier 12, and an output lead 14 that transmits the control signal to contact 15 or contact 16 as determined by the operation of reversing relay 13. In order to simplify my explanation of this system, I will assume that surface 90 is the elevator surface of an aircraft, and that this system is therefore used to control the aircraft in its pitch attitude. It should be understood, of course, that the system could be readily applied to the other control axes of an aircraft, or to a control axis of another type of dirigible craft. The input control signal on lead 17 could be derived, for example, from an elevator bridge of the type shown in my Patent No. 2,710,730, and, more particularly, corresponds to the signal that would normally appear on lead 226 shown in the elevator channel of the single drawing of that patent. Thus, lead 17 is intended to receive the normal control signals from the elevator channel of an autopilot bridge circuit.

In that event, as the magnitude of the input signal increases, the frequency of the pulsating output signal remains the same, but the duration of each pulse increases, so that the average rate of operation of the connected valves is increased in accordance with the magnitude of the input signal. When the input signal becomes large enough, the length of the pulses becomes long enough to overlap, thereby providing a continuous output signal to thereby continuously energize the connected valves.

I have found that amplifier 12 may also take the form of a square-wave signal generator, such as a free-running multi-vibrator, that provides an output of constant magnitude and frequency so long as the input signal is larger than a predetermined thresh-hold value. This type of amplifier is also effective to provide smooth control-surface movement that is proportional to the magnitude of the input signal on lead 17.

Relay 13 is illustrative of a workable arrangement for reversing the direction of movement of control surface 90. In the normal position shown, signals transmitted from amplifier 12 on lead 14 are carried by contact 15 and lead 24, and, as will be described in greater detail below, cause counterclockwise movement of surface 90. Relay 13 would ordinarily be automatically operated by suitable control means (not shown) in control system 11 whenever a clockwise movement of control surface 90 is called for. In that event, signals on lead 14 would be carried by contact 16 and lead 25, and would be effective to drive piston 52 of actuator 50 to the right.

Movement of control surface 90 is sensed by linkage 26, which provides suitable feedback control in control system 11. This feedback control is effective to null the signal on lead 17 when the control surface 90 has reached the position called for by the initial control signal on lead 17, in the well-known manner. A typical feedback system is shown in my above-mentioned patent and, with reference to the elevator bridge shown therein, the feedback linkage 26 could be effective to control a wiper such as 286 of a potentiometer 281 in said patent, to thereby null the autopilot bridge circuit.

The arrangement of the control system used in my invention, and the specific type of amplifier and reversing apparatus, form no part of my invention and are merely shown to illustrate typical control system features that are essential to a thorough explanation of my control system. Numerous other schemes to provide similar operation will suggest themselves to those skilled in the art, once the overall operation is understood.

In my overall system, I have shown apparatus for engaging the autopilot, including engage system 20, output leads 21 and 22, and relay 30 which is provided with a number of connected contacts and shown in its energized condition. In this arrangement, the autopilot could be effectively engaged merely by energizing leads 21 and 22, and this could be accomplished by means of a simple on-off switch. However, it would be preferable to provide some sort of a sensing device in engage system 20 that would prevent engagement until the signal on leads 17 and 14 is below a predetermined maximum value, in order to prevent a bump or hard-over signal when the autopilot is initially engaged, as is well known in the art. Upon engagement of the autopilot, and energization of relay 30, it is apparent that contacts 31—32 are closed, contacts 32—33 are opened, contacts 34—35 are closed, contacts 35—36 are opened, and contacts 37—38 are closed.

The circuitry to the left of actuators 50 and 60 is used to control electrically-operated normally-closed valves 54—55, 64—65, which are conventional electrically operated control valves that open cylinders 51 and 61 to their connected exhaust and input lines when they are energized, while closing said cylinders when they are not energized. Thus, when relay 30 is not operated, that is, with the autopilot disengaged, cylinders 51 and 61 are connected through operated valves 54 and 64, respectively, to their exhaust lines. The circuit for operating exhaust valves 54 and 64 begins at ground to the left of battery 23, and includes contacts 32—33, lead 41, valve 54, lead 42, contacts 35—36, lead 44, valve 64, and lead 45 to ground. Valves 54 and 64 are thereby operated in series, from battery 23, and there is no driving force on either of the pistons 52 or 62.

When engage relay 30 is energized as shown, and with lead 14 connected to lead 24 through contact 15 as shown, relays 54 and 65 are energized over a circuit including contacts 31—32, lead 41, valve 54, lead 42, contacts 34—35, lead 46, valve 65, and lead 45 to ground. Valves 54 and 65 are thereby energized in series with each positive pulse received from amplifier 12. Thus, with each pulse, input valve 65 connects the input line to cylinder 61, and if we assume that the input line is connected to a pressure source (not shown), air pressure is thereby pulsed into cylinder 61 and develops pressure on the left face of piston 62 thereby driving piston 62 and output ram 63 to the right. Piston 52 and output ram 53 are moved to the left under the influence of the parallelogram linkage to be described below, and air is exhausted from cylinder 51 through energized valve 54. Thus, a counterclockwise movement is imparted to control surface 90.

With relay 13 energized, signals on lead 14 are transmitted through contact 16 and lead 25 to contacts 37—38, lead 43, valve 55, and valve 64 to lead 45 and ground, thereby providing a series energizing circuit for valves 55 and 64. In that event, pulses on lead 14 are effective to energize these valves 55 and 64, thereby causing pulses of air pressure to be ported into cylinder 51, to thereby drive piston 52 and output ram 53 to the right. The parallelogram linkage is then effective to drive piston 62 and output ram 63 to the left, and the air is exhausted from cylinder 61 through energized exhaust valve 64. This, as will be presently understood, causes clockwise rotation of control-surface 90.

Figure 2:
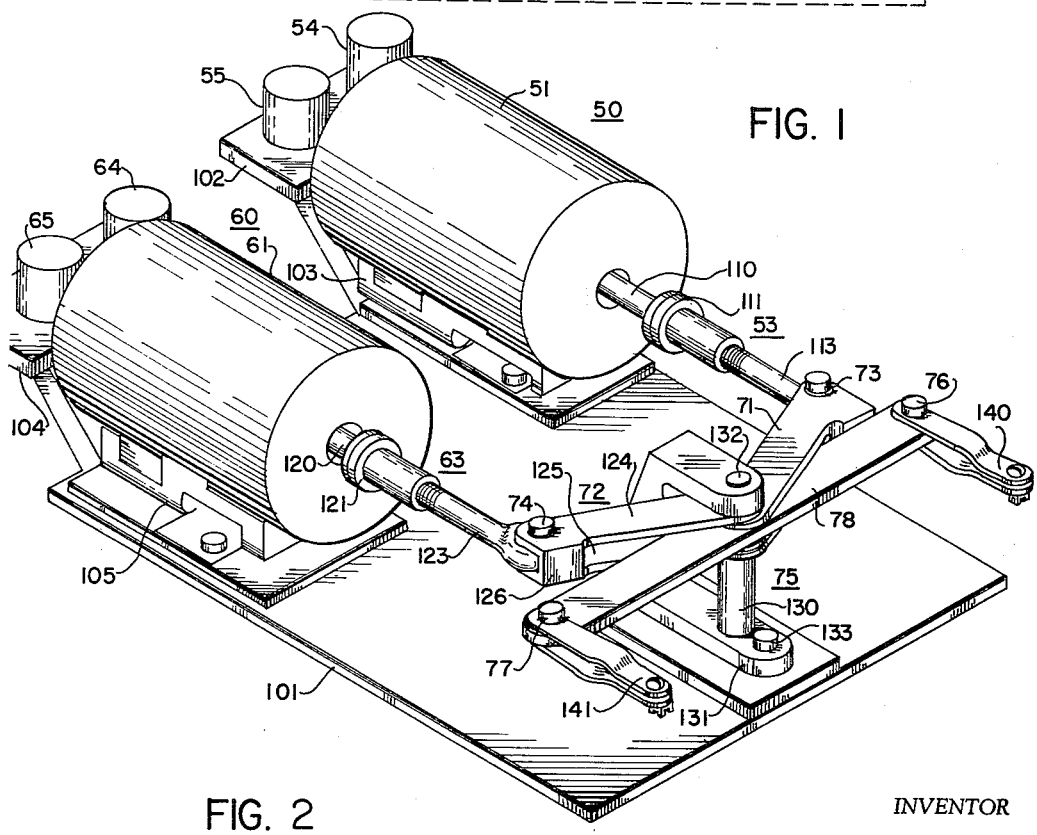
FIGURE 2 is an isometric view of a portion of the system shown in FIGURE 1, showing the details of the control, or disengage, linkage that permits independent operation of the craft through the manual control device.

The operation of the control linkage to the right of the two actuators 50 and 60 will be best understood by reference to FIGURE 2, wherein equivalent components are provided with the same identification numbers used in FIGURE 1. In FIGURE 2, actuators 50 and 60 are shown to be preferably mounted on supports 103 and 105, respectively, which are in turn mounted on base member 101, so as to position output rams 53 and 63 to move along spaced-apart parallel axes. Control valves 54 and 55 are mounted on support member 102 at the rear of cylinder 51, and control valves 64 and 65 are mounted to support member 104 at the rear of cylinder 61. Output ram 53 of actuator 50 includes a shaft 110 having a stop 111 mounted thereon, with eye-shaped coupling member 113 threaded into the end thereof as shown. Member 113 permits ram 53 to be rotatably secured to crank arm 71 by means of pin 73.

Output ram 63 of actuator 60 is identical to ram 53, and includes shaft 120 having a stop 121 mounted thereon, and an eye-shaped coupling member 123 axially mounted at the end thereof. Ram 63 is rotatably secured to crank arm 72 by means of pin 74.

Crank arms 71 and 72 are identical and interchangeable, except reversed during assembly of my linkage, and each includes spaced-apart parallel arms such as 124 and 125 rotatably pinned to support member 132 on opposite sides of bar 78, and a flattened surface such as 126 that bears against bar 78 to provide the necessary control movement. Support assembly 75 includes a base member 131 mounted to member 101 by means of bolts such as 133, with a support member 130 mounted to support the bar 78 and crank arms 71 and 72, with pin 132 mounted between members 130 and 131. Thus, bar 78, and arms 71 and 72, freely rotate with respect to assembly 75. Bar 78 rotates about its midpoint as shown, and is rotatably connected to arms 140 and 141 by pins 76 and 77, respectively.

*Operation*

During manual maneuvers of the craft, with the autopilot disengaged, the control stick 80 is effective to move control surface 90 in such a manner as to be independent of the automatic control system and actuator. For example, if control stick 80, which is pivoted at points 81 and 82, is pushed forward, that is in a clockwise direction, pin 81 carries bar 86 of parallelogram linkage 70 to the right. Bar 87 of parallelogram linkage 70, which is pinned at points 83 and 85 to bars 86 and 88, respectively, and at point 84 to a fixed point, is then caused to rotate clockwise about point 84, thereby carrying control surface 90 through clockwise rotation. Bar 88, which is pinned at points 77 and 85 to bars 78 and 87, respectively, is thereby moved to the left, and bar 88, which includes arm 141 shown in FIGURE 2, together with bar 86 which includes arm 140, cause bar 78 to rotate about point 75 in a clockwise direction. Bar 78 is thereby caused to impinge upon surface 126 of arm 72, thereby forcing ram 63 into cylinder 61 until stop 121 engages the end of cylinder 61. It will be recalled that during manual operation of the craft, exhaust valve 64 is energized, permitting piston 62 to move to the left and thereby exhaust the air from cylinder 61. The length of the various linkages is chosen to cause stop 121 to engage the end of cylinder 61 only after a greater than normal forward movement of stick 80, with the result that normal operation of stick 80 can be effected without any contact between bar 78 and surface 126 after the ram has reached the stop position.

In a similar manner, when stick 80 is moved counterclockwise, piston arm 71 is rotated counterclockwise thereby forcing ram 53 into cylinder 51 until stop 111 engages the end of cylinder 51. It is apparent, therefore, that after maximum movements of control stick 80, parallelogram linkage 70 is free to move independently of the autopilot, the automatic control system, or the actuators 50 and 60.

During automatic operation of the craft, and with relay 13 de-energized as shown, pulsating signals on lead 14 would cause pressurized air to be pulsed through input valve 65 into cylinder 61, thereby forcing piston 62 and ram 63 to the right. Crank arm 72 would thereby be carried in a counterclockwise direction, and surface 126 thereof would impinge on arm 78 and thereby move arm 88 to the right, arm 87 counterclockwise, and arm 86 to the left, causing counterclockwise rotation of control surface 90 and control stick 80. Upon operation of relay 13, it is apparent that the control stick and control surface 90 would be moved in a clockwise direction under the influence of the automatic system. It should also be noted that the system would work equally well by connecting input valves 55 and 65 to a vacuum line, except that the direction of surface movement would then be reversed for corresponding positions of the movable contact arm of relay 13.

Although a battery 23 is shown to control the disengaged condition of my system, it may be desired to use the common source of supply in the control system for any electrical energization in the system, in which event it would be best to use normally open exhaust valves as a fail-safety precaution. In that event, upon failure of the electrical system, both exhaust valves will be opened and manual control would thereby be facilitated. It would then be necessary to simultaneously energize valves 54 and 55, thereby closing exhaust valve 54 and opening input valve 55 to achieve one direction of control-surface movement; and simultaneous energization of valves 64 and 65, to thereby close valve 64 and open valve 65, would be effective to cause reverse movement of surface 90. Numerous other modifications of the circuitry will suggest themselves to those skilled in the art; and although four separate valves are shown, it should be understood that any valving means capable of accomplishing the desired results can be used.

What has been described is considered to be a preferred embodiment of my invention, but it should be understood that various modifications may be made without departing from the spirit and scope thereof. Thus, I do not wish to be limited to the particular form shown except as indicated by the following claims.

What is claimed is:

1. Control apparatus, comprising: a pair of adjacently mounted pneumatic actuators having their output rams arranged to operate along spaced-apart parallel axes; a pair of control ports in each of said actuators; a plurality of normally closed, electrically operated control valves; means including an input pair of said valves for individually connecting one of the ports in each of said actuators to a source of high pressure air; means including an exhaust pair of said valves for exhausting air from said actuators by way of the other ports therein; a support member mounted intermediate said rams; a first crank ram rotatably pinned at one end to said support member and at the other end to one of said output rams; a second crank arm rotatably pinned at one end to said support member and at the other end to the other of said output rams; a controlled member; a control bar rotatably pinned at its center to said support member; means connected between the extremities of said control bar and said controlled member whereby to achieve reversible control of said controlled member; and electrical control means for individually operating said control valves, operation of the input valve of one actuator and the exhaust valve of the other actuator being effective to operate said one actuator to drive the corresponding ram and crank arm against said control bar to achieve forward movement of said controlled member, and operation of the exhaust valve of said one actuator and the input valve of said other actuator being effective to operate said other actuator to drive the other ram and crank ram against said control bar to achieve reverse movement of said controlled member, the non-driven end of said control bar being effective to force the non-driven ram into the actuator from which air is exhausted.

2. Control apparatus as claimed in claim 1, additionally comprising: manual control means connected to control the movement of said control bar whereby to achieve reversible-manual control of said controlled member, operation of said manual control means being effective during the operation of said pair of exhaust valves to move both said crank arms out of engagement with said control bar by driving both said rams into said actuators.

3. Control apparatus for reversibly controlling a condition control member, comprising: a pair of adjacently mounted pneumatic actuators having their output members arranged to operate along spaced-apart parallel axes; a pair of control ports in each of said actuators; a plurality of control valves; means including a first pair of said valves for individually connecting one of the ports in each of said actuators to a control source, said control source being effective to operate said actuators responsive to the opening of said first valves; means including a second pair of said valves for individually connecting the other of said ports to ambient air; a support member mounted intermediate said members; a control bar rotatably pinned at its center to said support member; coupling means controllably connected between the extremities of said control bar and said condition control member; a first crank arm rotatably pinned at one end to said support member and at the other end to one of said output members, operation of said one output member by its corresponding actuator being effective to force said first crank arm against said control bar and thereby operate said coupling means to move said condition control member in a first sense; a second crank arm rotatably pinned at one end to said support member and at the other end of said output members, operation of said other output member by its corresponding actuator being effective to force said second crank arm against said control bar and thereby operate said coupling means to move said condition control member in a reverse sense; and control means for simultaneously causing only a first valve of one actuator and a second valve of the other actuator to be opened, or for simultaneously causing only a first valve of said other actuator and a second valve of said first actuator to be opened, to thereby reversibly control said condition control member.

4. Control apparatus, comprising: a pair of pneumatic actuators having their output members arranged to operate along spaced-apart parallel axes and each being provided with a pair of control ports; a plurality of electrically operated control valves; means including a first pair of said valves individually connected between one of the ports in each of said actuators and a control source, said control source being effective to operate said actuators responsive to the opening of said first valves; means including a second pair of said valves connected between the other of said ports and ambient air; a support member mounted intermediate said output members; a pair of crank arms individually and rotatably mounted at one end to said output members and at the other end to said support member; a controlled member; a control bar rotatably pinned at its center to said support member; coupling means controllably connected between the extremities of said control bar and said controlled member; and electrical means for causing in a first condition only a first valve of one actuator and a second valve of the other actuator to be opened to thereby operate said one actuator and drive the corresponding output member and crank arm against one end of said control bar to thereby operate said coupling member and achieve movement of said controlled member in one sense, and for causing in a second condition only a second valve of said one actuator and a first valve of said other actuator to be opened to thereby operate said other actuator and drive the other output member and crank arm against the other end of said control bar to thereby operate said coupling member and achieve movement of said controlled member in a second sense, the non-driven end of said control bar being effective to move the non-driven output member in a direction opposite to the direction of movement of the driven output member.

5. Control apparatus as claimed in claim 4, additionally comprising: manual control means connected to said coupling member and effective when operated to move said control bar and achieve reversible-manual control of said controlled member, and said electrical means being effective in a third condition to cause only said second valves to be opened, operation of said manual control means being effective during said third condition of said electrical means to move both said crank arms and output members out of engagement with said control bar whereafter said manual control means is effective to operate said controlled member independently of said actuators and crank arms.

6. A control system for a steerable craft having a control surface for changing the attitude thereof, comprising: a control bar rotatably mounted at its center; coupling means connected between the extremities of said control bar and said control surface; manual control means connected to move said coupling means and control bar to thereby steer said craft; automatic control means comprising a pair of fluid controlled actuators having output rams arranged to move along spaced-apart parallel axes for controlling the movement of said control bar responsive to automatic control signals; and means for moving said output rams to a position wherein manual movement of said bar and coupling means is effected independently of said automatic control means.

7. A control system for a dirigible craft having a control surface for changing the attitude thereof, comprising: engageable automatic control means including a pair of fluid controlled actuators having output rams arranged to move along spaced-apart parallel axes for controlling the movement of said surface responsive to automatic control signals received during the engaged condition thereof; a support member mounted intermediate said rams; a control bar rotatably mounted at its center to said support member; coupling means connected between the extremities of said control bar and said control surface whereby to steer said craft responsive to control bar movements; a pair of oppositely disposed crank arms individually and rotatably mounted at one end to said individual rams and at the other end to said support member, each provided with a bearing surface adjacent said one end, said bearing surfaces being effective to impinge on said bar during the engaged condition of said automatic control system and thereby cause movement thereof to steer said craft; and manual control means connected to move said coupling means and control bar to thereby steer said craft, said bar being effective to impinge on said bearing surfaces during the disengaged condition of said automatic control system to move said rams and crank arms to a position whereat movement of said control bar is independent thereof.

8. A control system for controlling a condition through a condition changing device, comprising: a control bar rotatably mounted at its center; coupling means connected between two points on opposite sides of said control bar and said condition changing device; manual control means connected to move said coupling means and control bar to thereby control said condition; automatic control means comprising a pair of fluid controlled actuators having output rams arranged to move along spaced-apart parallel axes for controlling the movement of said control bar responsive to automatic control signals; and means for moving said output rams to a position wherein manual movement of said bar and coupling means may be effected subsequently independently of said automatic control means.

9. A control system for controlling a condition through a condition changing device, comprising: a rotatable control bar; coupling means connected between the rotatable bar and said condition changing device; manual control means connected to move said coupling means and control bar to thereby control said condition; automatic control means comprising a pair of fluid controlled actuators having output rams arranged to effect opposite movement of said control bar in response to automatic control signals; and means for moving said output rams to a position wherein manual movement of said bar and coupling means may be effected subsequently independently of said automatic control means.

10. A control system for controlling a condition through a condition changing device, comprising: a rotatable control bar; coupling means connected between the control bar and condition changing device; manual control means connected to move said coupling means and control bar to thereby operate said condition changing device; automatic control means comprising fluid controlled actuator means arranged to effect opposite movements of said control bar in response to automatic control signals; and means for moving said actuator means to a position wherein manual movement of said bar and coupling means may be effected independently of said automatic control means.

11. Control apparatus, comprising: a pair of adjacently mounted fluid actuators having their output ram means arranged to operate along spaced-apart parallel axes; a pair of control ports in said actuators; a plurality of electrically operable control valve means; means including an input pair of said valve means for individually connecting one port of an actuator to a source of high pressure fluid; means including an exhaust pair of said valve means for exhausting fluid from said actuators; a support member mounted intermediate said ram means; a first guide means for one of said output ram means; a second guide means for the other of said output ram means; a controlled member; a control bar rotatably pinned to said support member; means connected between points on opposite sides of the point of rotation of said control bar and said controlled member whereby to achieve reversible control of said controlled member; and electrical control means for individually operating said control valve means, operation of the input valve means of one actuator and the exhaust valve means of the other actuator being effective to operate said one actuator to drive the corresponding ram means against said control bar to achieve forward movement of said controlled member, and operation of the exhaust valve means of said one actuator and the input valve means of said other actuator being effective to operate said other actuator to drive the other ram means against said control bar to achieve reverse movement of said controlled member, the non-driven end of said control bar being effective to force the non-driven ram means into the actuator from which fluid is exhausted.

12. In control apparatus for a steerable craft having attitude control means; a displaceable control member; coupling means connected between the control member and said attitude control means; manual control means connected to said coupling means and control member to thereby steer said craft; automatic control means comprising a pair of fluid control actuators having output rams arranged to move along spaced-apart parallel axes for controlling the movement of said control member responsive to automatic control signals; and means for moving said output rams to a position wherein manual movement of said member and coupling means is thereafter effected independently of said automatic control means.

13. In a control system for a steerable craft having attitude control means for changing the attitude of the craft, in combination: a rotatable control member; coupling means between said control member and said attitude changing means; manually operable means connected to move said coupling means and control member to thereby steer said craft; automatic control means comprising a pair of fluid controlled actuators having output rams arranged to control the movement of said control member and responsive to automatic control signals; and means for moving said output rams to a position wherein manual movement of said member and coupling means is thereafter effected independently of said pair of actuators.

14. In control apparatus for a steerable craft having attitude changing means: a pivotally mounted control member; coupling means connected between the control member and said attitude control means; manually operable means connected to move said coupling means and control member to thereby steer said craft; automatic control means comprising a pair of fluid controlled actuators having output rams arranged to control the movement of said control member and responsive to automatic signals; means for removing automatic control of the ram; and means for moving said output rams to a position wherein manual movement of said member and coupling means is thereafter effected independently of said rams.

References Cited in the file of this patent

UNITED STATES PATENTS

| | | |
|---|---|---|
| 1,765,069 | Gibson | June 17, 1930 |
| 1,890,041 | McLeod | Dec. 6, 1932 |
| 1,969,462 | Hodgkins | Aug. 7, 1934 |
| 2,452,599 | Paulus et al. | Nov. 2, 1948 |
| 2,620,772 | McLane | Dec. 9, 1952 |
| 2,678,177 | Chenery | May 11, 1954 |
| 2,773,660 | Rasmussen | Dec. 11, 1956 |